United States Patent
Reisch et al.

(10) Patent No.: US 11,143,246 B2
(45) Date of Patent: Oct. 12, 2021

(54) SWITCHING ARRANGEMENT AND TRANSMISSION

(71) Applicant: ZF Friedrichshafen AG, Friedrichshafen (DE)

(72) Inventors: Matthias Reisch, Ravensburg (DE); Wolfgang Rieger, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 145 days.

(21) Appl. No.: 16/414,308

(22) Filed: May 16, 2019

(65) Prior Publication Data

US 2019/0360535 A1 Nov. 28, 2019

(30) Foreign Application Priority Data

May 22, 2018 (DE) ...................... 10 2018 207 970.6

(51) Int. Cl.
*F16D 23/02* (2006.01)
*F16D 11/14* (2006.01)
(Continued)

(52) U.S. Cl.
CPC .............. *F16D 23/02* (2013.01); *F16D 11/14* (2013.01); *F16D 2011/002* (2013.01); *F16H 2063/3093* (2013.01)

(58) Field of Classification Search
CPC .............. F16D 11/00; F16D 2011/002; F16D 2011/008; F16D 11/10; F16D 11/14;
(Continued)

(56) References Cited

U.S. PATENT DOCUMENTS

| 2,320,757 A | 6/1943 | Sinclair et al. |
| 4,552,258 A | 11/1985 | Sigg et al. |
| (Continued) | | |

FOREIGN PATENT DOCUMENTS

| DE | 3306131 A1 | 8/1984 |
| DE | 3901310 C1 | 11/1989 |
| DE | 102008000647 A1 | 9/2009 |

OTHER PUBLICATIONS

English language machine translation of DE 102008000647 A1, obtained from Espacenet on Jan. 6, 2021. (Year: 2021).*

*Primary Examiner* — Richard M Lorence
(74) *Attorney, Agent, or Firm* — Dority & Manning, P.A.

(57) ABSTRACT

A connecting arrangement includes first and second idler gears (6, 7) arranged coaxially and connectable via an engagement unit. The engagement unit includes a coupling element coupled to the first idler gear (7) in a direction of rotation and axially movable between a home position and a coupling position. In the coupling position, the coupling element is coupled to the second idler gear (6) in addition to being coupled to the first idler gear (7) in the direction of rotation. In the home position, the coupling element and the second idler gear (6) are freely turnable with respect to each other. The first and second idler gears (6, 7) are helical-cut spur gears. The coupling element is guided in a helically extending guide (18) on the first idler gear (7) and, in the coupling position, engages into a helically extending engagement geometry (21) on the second idler gear (6).

12 Claims, 4 Drawing Sheets

(51) Int. Cl.
*F16D 11/00* (2006.01)
*F16H 63/30* (2006.01)

(58) Field of Classification Search
CPC .......... F16D 21/06; F16D 23/02; F16H 3/006; F16H 2003/0807; F16H 2063/3093
See application file for complete search history.

(56) References Cited

U.S. PATENT DOCUMENTS

| | | | | |
|---|---|---|---|---|
| 4,619,150 | A | * | 10/1986 | Wiggenhauser ........ F16D 11/14 29/893.1 |
| 5,031,741 | A | | 7/1991 | Otto |
| 9,593,744 | B2 | * | 3/2017 | Hedman ................ F16H 3/091 |

\* cited by examiner

SWITCHING ARRANGEMENT AND TRANSMISSION

FIELD OF THE INVENTION

The invention relates generally to a connecting arrangement for the engageable coupling of two idler gears of a transmission, including a first idler gear and a second idler gear which are arranged coaxially to each other and are connectable to each other in a rotationally fixed manner via an engagement unit. The engagement unit includes a coupling element which is coupled to the first idler gear in the direction of rotation and is axially movable with respect to the first idler gear between a home position and a coupling position. The coupling element, in the coupling position, is also coupled to the second idler gear in addition to being coupled to the first idler gear in the direction of rotation, whereas, in the home position of the coupling element, the coupling element and the second idler gear are freely displaceable with respect to each other. Moreover, the invention relates generally to a transmission including an aforementioned connecting arrangement.

BACKGROUND

In the case of engageable spur gear drives, spur gear stages in the form of idler gear-fixed gear pairings are known, in which one of the intermeshed spur gears is located on a particular shaft in a rotationally fixed manner, as a fixed gear, while the other intermeshed spur gear is rotatably mounted, axially in parallel, on an associated shaft, as an idler gear and is rotationally fixed to this shaft only after actuation of an associated engagement unit, in order to implement a power path between the shafts via the spur gear stage. Apart therefrom, systems are also utilized in some transmissions, in which the coaxial idler gears of two spur gear stages are directly couplable to each other in a rotationally fixed manner in order to conduct the power flow across both spur gear stages without the power flow being conducted across the shaft on which the idler gears are rotatably mounted.

In the case of a spur gear stage in which the idler gear is connectable to the shaft only in a rotationally fixed manner, differential speeds between the particular idler gear and the particular shaft occur only when no power flow is conducted across the particular spur gear stage. In the case of a rotationally fixed coupling of idler gears of two spur gear stages, however, differential speeds with respect to the particular shaft also occur during the conveyance of the power flow, which also results in greater demands on bearings of the idler gears due to the greater load.

DE 10 2008 000 647 A1 describes a connecting arrangement for the engageable coupling of two idler gears, with the aid of which the two idler gears, which are arranged coaxially to each other, can be connected to each other in a rotationally fixed manner via a coupling element of an engagement unit. The coupling element is designed as a shifting dog which is guided on the first idler gear in a rotationally fixed and axially displaceable manner via driving toothing. The coupling element is movable axially between a home position and a coupling position, wherein the coupling element, in the coupling position, engages via the driving toothing into a tooth system of the second idler gear, so that an indirect, rotationally fixed connection of the two idler gears is established via the coupling element.

SUMMARY OF THE INVENTION

Proceeding from the above-described background, example aspects of the present invention create a connecting arrangement for the engageable coupling of two helical-cut idler gears of a transmission, wherein a transmission of axial forces between the idler gears is made possible with the aid of this connecting arrangement.

According to example aspects of the invention, a connecting arrangement for the engageable coupling of two idler gears includes a first idler gear and a second idler gear which are arranged coaxially to each other and are connectable to each other in a rotationally fixed manner via an engagement unit. The engagement unit includes a coupling element which is coupled to the first idler gear in the direction of rotation and is axially movable with respect to the first idler gear between a home position and a coupling position. In the coupling position, the coupling element is also coupled to the second idler gear in addition to being coupled to the first idler gear in the direction of rotation, whereas, in the home position of the coupling element, the coupling element and the second idler gear are turnable freely with respect to each other.

With the aid of the connecting arrangement according to example aspects of the invention, therefore, two idler gears are connectable to each other in a rotationally fixed manner, wherein, in the present case, an "idler gear" is understood to be a spur gear which is rotatably mounted on a shaft and, in particular, is part of a spur gear stage of a transmission. Within the spur gear stage, the particular idler gear is then meshed, at a running tooth system, with a further spur gear of the spur gear stage. The further spur gear may be rotatably mounted on an axially offset shaft, likewise as an idler gear, although the further spur gear is preferably located on the axially offset shaft in a rotationally fixed manner, as a fixed gear.

The two idler gears are located coaxially to each other and therefore have a common axis of rotation. The two idler gears may be arranged axially directly adjacent to each other. Within the scope of the invention, it is also conceivable, however, that a further component of the transmission is provided between the two idler gears. The coupling element of the engagement unit is continuously coupled to the first idler gear in the direction of rotation, wherein the coupling element is movable relative to the first idler gear axially between the home position and the coupling position, however. In the coupling position, the coupling element is then also coupled to the second idler gear in the direction of rotation, and so, ultimately, the first idler gear and the second idler gear are also coupled to each other in the direction of rotation via the coupling element. However, the coupling element and the second idler gear are turnable relative to each other in the home position of the coupling element, wherein, in the home position, the first idler gear and the second idler gear are then also rotatable relative to each other.

Within the meaning of the invention, the term "axially" means an orientation in the direction of an axis of rotation, about which the idler gears, which are arranged coaxially to each other, are rotatable. Moreover, "in the direction of rotation" and "in the circumferential direction" mean an orientation in the direction of a rotary motion taking place about this axis of rotation.

Example aspects of the invention now encompasses the technical teaching that the idler gears are present as helical-cut spur gears. Moreover, the coupling element is guided in a helically extending guide which is formed on the first idler gear. In the coupling position, the coupling element engages into a helically extending engagement geometry formed on the second idler gear.

In other words, the coupling element, with respect to the first idler gear, is therefore guided in a guide which has a helical course, i.e., which, as a helix, has a course changing in both the axial direction and in the circumferential direction. In addition, with respect to the second idler gear, a likewise helically extending engagement geometry is formed thereon, into which the coupling element engages in the coupling position. Both idler gears are designed as helical-cut spur gears and therefore include running teeth, which are designed as helical gearing in each case.

Such an embodiment of a connecting arrangement has the advantage that, due to the design of the guide of the coupling element with respect to the first idler gear and also due to the engagement geometry with respect to the second idler gear, axial forces which occur during operation due to the design of the idler gears as helical-cut spur gears are transmittable between the idler gears via the coupling element upon a coupling of the two idler gears. This is the case because the helical guide, due to the course of the helical guide in the circumferential direction and in the axial direction, allows for the transmission of an axial force between the first idler gear and the coupling element. A transmission of an axial force between the coupling element and the second idler gear likewise takes place in the coupling position of the coupling element, also via the helically extending engagement geometry, since the engagement geometry has not only the variable course in the axial direction, but also a variable course in the circumferential direction. Therefore, if the coupling element is in the coupling position and, therefore, engages into the engagement geometry of the second idler gear, a transmission of an axial force takes place between the first idler gear and the coupling element as well as between the coupling element and the second idler gear, which therefore results in a transmission of axial forces between the idler gears indirectly via the coupling element.

The aforementioned transmission of axial forces between the coupled-together idler gears makes it possible to simplify bearings of the idler gears, since a common axial bearing of the idler gears may be provided. Since, in addition, an at least partial compensation of the axial forces may be achieved due to an appropriate heterodirectional orientation of the axial forces of the idler gears, a simplified bearing, such as a sliding bearing, may be utilized, if necessary, for such an axial bearing. Overall, a connecting arrangement having a compact configuration and requiring little manufacturing effort can therefore be achieved.

In DE 10 2008 000 647 A1, although the two idler gears can also be coupled to each other in their directions of rotation via a coupling element, a coupling in the direction of rotation takes place here via a driving toothing. This does not allow for a transmission of axial forces between the coupling element and the idler gears, and so a transmission of axial forces between the idler gears cannot take place, either. Therefore, a more complex axial bearing must be provided here when the idler gears are designed as helical-cut spur gears.

The guide of the coupling element, with respect to the first idler gear, has the effect that the coupling element is turned with respect to the first idler gear upon an axial displacement of the coupling element with respect to the first idler gear, due to the helical course of the guide. The coupling element likewise turns relative to the second idler gear after the engagement into the engagement geometry and the axial movement, which is still underway, into the coupling position. In a discrete axial position, the coupling element is rotationally fixed to the first idler gear via the guide, i.e., upon assumption of an axial position and in the absence of an axial movement toward the first idler gear, the first idler gear and the coupling element cannot be turned relative to each other. The same is the case with respect to the second idler gear after an engagement into the engagement geometry and an assumption of an axial position, due to the helical course of the engagement geometry, since a relative turning between the coupling element and the second idler gear is likewise prevented via the engagement geometry after an assumption of an axial position of the coupling element and the engagement of the coupling element.

According to one embodiment of the invention, pitches of running teeth of the idler gears, of the helically extending guide, and of the helically extending engagement geometry correspond to each another. A "pitch" of a tooth system or a driving part is understood to be the particular axial path along the particular associated axis, which is required in order to achieve one complete revolution of the particular component about the axis on an imagined extension of the particular tooth system or driving part under consideration. Due to the selection of pitches which are identical or which at least largely correspond to each other, it is made possible for the axial forces, which are transmitted in the coupling position of the coupling element, to nearly completely compensate for each other.

This is the case because the physical correlation is such that an axial force resulting at the particular component is proportional to the introduced torque and is dependent on the pitch. Therefore, the particular component is essentially free from axial forces when the absolute value of the torque introduced at a tooth system or a helical driving part is equal to the torque output at another tooth system or a helical driving part, provided the tooth systems or the driving parts essentially have the same pitch. This has the result that an axial bearing of the idler gears may be proportioned appropriately compactly, since no axial forces or only very light axial forces need to be absorbed.

As a special case, the tooth systems and the driving parts, i.e., the guide and the engagement geometry, may be arranged on the same diameter and may then be designed to have the same lead angle. It is particularly preferred, however, when the tooth systems and the driving parts are formed on different diameters, and so different lead angles must be selected in order to obtain the identical pitch.

In one refinement, the pitches of the running teeth of the idler gears and of the helical courses of the guide and of the engagement geometry are provided with lead angles having the same pitch direction, i.e., all either left-hand or right-hand. Advantageously, an opposed orientation of the axial forces is achieved as a result, so that the axial forces compensate for each other.

In one further embodiment of the invention, the guide and/or the engagement geometry are/is configured as helical gearing. Therefore, either the guide or the engagement geometry or both the guide as well as the engagement geometry are present as helical gearing, via which the particular helical course can be implemented in a simple way.

One further design option of the invention is that the coupling element is a synchronizer sleeve which, in the coupling position, is coupled in a rotationally fixed manner both to the first idler gear as well as to the second idler gear. In one refinement of this design option, the synchronizer sleeve is then also provided with at least one helical gearing, via which the synchronizer sleeve is guided in the guide and/or with the aid of which the synchronizer sleeve engages into the engagement geometry, in the coupling position. As a result, a suitable embodiment of the coupling element may be implemented. Specifically, a helical gearing may be formed on the synchronizer sleeve, which is utilized for the guidance with respect to the first idler gear and, simultaneously, is also provided for the engagement into the engagement geometry of the second idler gear. The synchronizer sleeve may also be designed, however, to include multiple helical gearings which are configured differently from each other, wherein one helical gearing is provided for the guidance at the first idler gear and the other helical gear is provided for the engagement into the engagement geometry. Moreover, an alternative component may also be provided as the coupling element, such as a bolt establishing the coupling.

According to one further embodiment of the invention, the engagement unit is designed as a dog clutch unit, wherein the dog clutch unit preferably includes the synchronizer sleeve functioning as a shifting dog. As a result, an engagement unit including a small number of components and, therefore, requiring little manufacturing effort may be obtained. According to an alternative design option of the invention, the engagement unit is configured as a lock-synchronizer mechanism. This engagement unit as well includes, in particular, a synchronizer sleeve designed in the way described above, wherein, in addition to this synchronizer sleeve, one or multiple synchronizer rings are provided, with the aid of which, during the course of the transfer of the synchronizer sleeve from the home position into the coupling position, a differential speed initially builds up between the idler gears to be coupled and, therefore, the idler gears are initially synchronized in terms of their turning motions.

In one refinement of the invention, the idler gears are rotatably mounted on a shaft. It is further preferred when the coupling element may then also be moved axially into a further coupling position in which the coupling element is rotationally fixed to the shaft. In this further coupling position, a rotationally fixed connection of the first idler gear to the shaft is also brought about with the aid of the coupling element, and so, as a result, the engagement of a transmission ratio step between the shaft and a further shaft may take place, on which a fixed gear meshing with the first idler gear is arranged. In the refinement, a helically configured engagement geometry is likewise to be provided with respect to the shaft, for example, a helical gearing, wherein this engagement geometry should preferably correspond, in terms of the pitch of the engagement geometry, essentially to the pitches of the running teeth of the first idler gear and of the guide on the first idler gear. The pitch direction should likewise be identical to the pitch directions of the running teeth of the first idler gear and of the guide on the first idler gear.

A connecting arrangement configured according to the aforementioned variant is, in particular, part of a transmission and is utilized in this case for the rotationally fixed coupling of two idler gears. As a result, in the particular transmission, in particular, a so-called winding path gear may be implemented, for the implementation of which two spur gear stages are jointly utilized by way of the rotationally fixed coupling of the idler gears. Specifically, the transmission may be configured as a dual clutch transmission, wherein the spur gear stage including the first idler gear is then associated with a first sub-transmission, and the spur gear stage including the second idler gear is associated with a second sub-transmission of the dual clutch transmission.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous embodiments of the invention, which are explained in the following, are represented in the drawings. Wherein.

DETAILED DESCRIPTION

Figure 1:
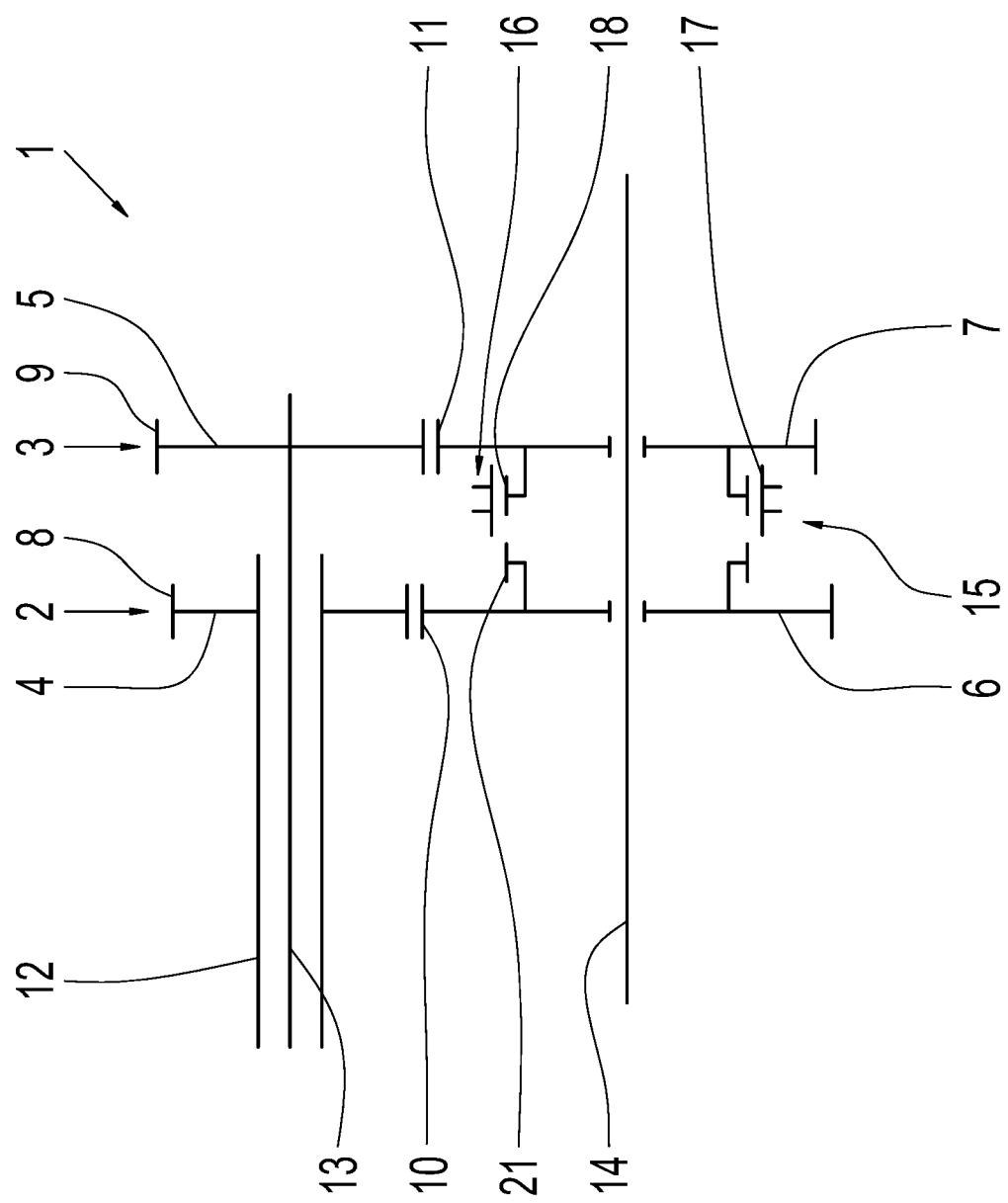
FIG. 1 shows a diagrammatic view of a part of a transmission including a connecting arrangement according to a first embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a part of a transmission 1, wherein the transmission 1 is represented in the area of two spur gear stages 2 and 3. The spur gear stages 2 and 3 are each composed of one first or fixed gear 4 and 5, respectively, and one second or idler gear 6 and 7, respectively, wherein the fixed gear 4 or 5 of the spur gear stage 2 or 3, respectively, is meshed, at a running tooth system 8 or 9, respectively, with a running tooth system 10 or 11, respectively, of the idler gear 6 or 7, respectively. The running teeth 8, 9, 10 and 11 are configured as helical gearing, and so the fixed gears 4 and 5 as well as the idler gears 6 and 7 are present as helical-cut spur gears.

The fixed gear 4 of the spur gear stage 2 is arranged in a rotationally fixed manner on a shaft 12 which is configured as a hollow shaft and extends coaxially to the one shaft 13 which carries the fixed gear 5 of the spur gear stage 3. The two idler gears 6 and 7, however, are rotatably mounted on a shaft 14 which is located so as to be axially offset with respect to the shafts 12 and 13. In the present case, the shafts 12 and 13 may be input shafts of a dual clutch transmission, while the shaft 14 may be present either as a countershaft of the transmission 1 or as an output shaft.

As a distinguishing feature, a connecting arrangement 15 is now provided, with the aid of which the two idler gears 6 and 7 are couplable to each other in a rotationally fixed manner in order to be able to conduct a power flow from one of the shafts 12 or 13 via the two spur gear stages 2 and 3 to the respective other shaft 13 or 12. This connecting arrangement 15 includes an engagement unit with a coupling element 16 which is configured as a synchronizer sleeve 17, wherein the synchronizer sleeve 17 is coupled to the idler gear 7 in the direction of rotation and is movable axially relative to the idler gear 7. In principle, the engagement unit is configured in the manner of a dog clutch unit.

Figure 2:
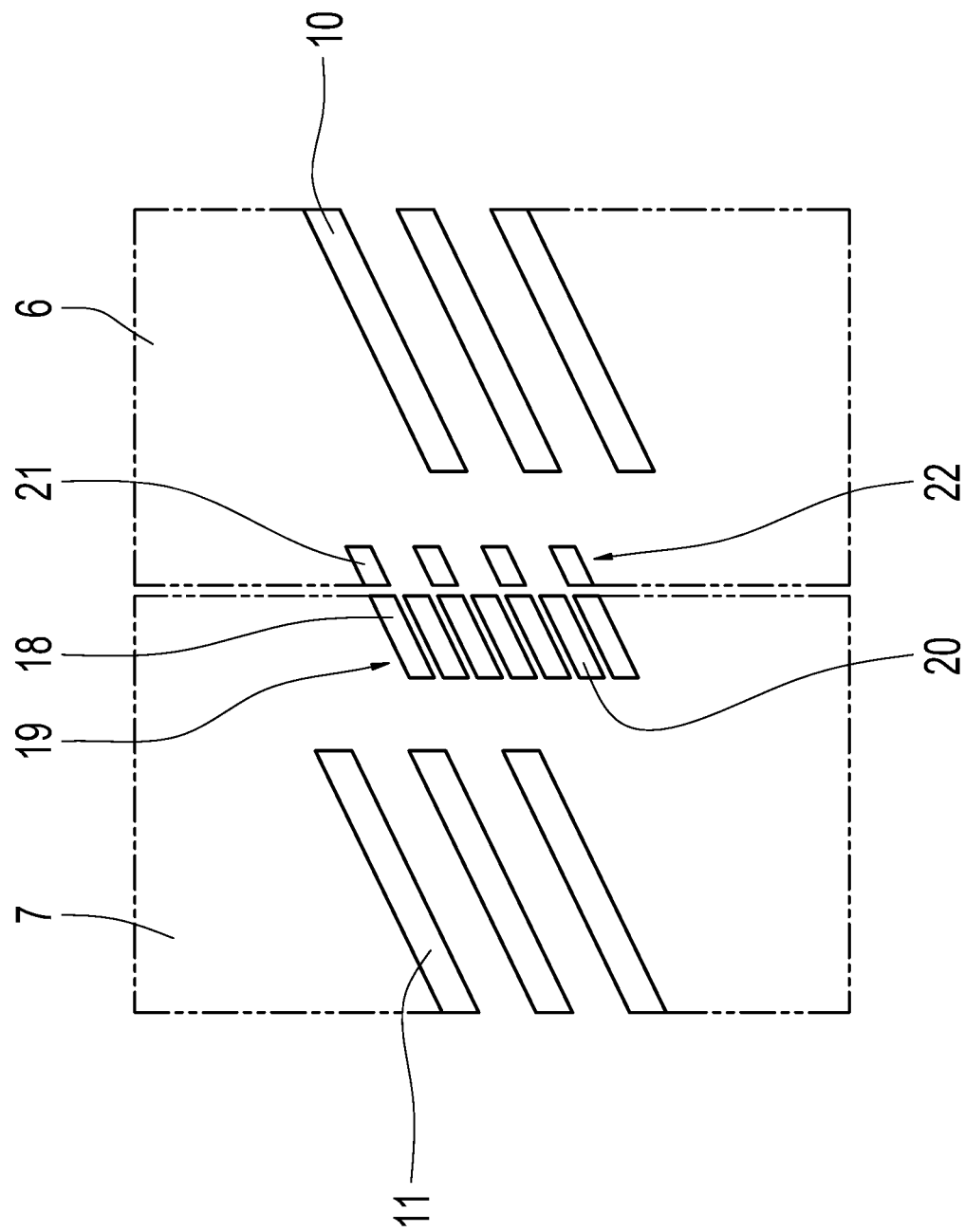
FIG. 2 shows a schematic of the connecting arrangement from FIG. 1, shown in a first engagement condition.
Figure 3:
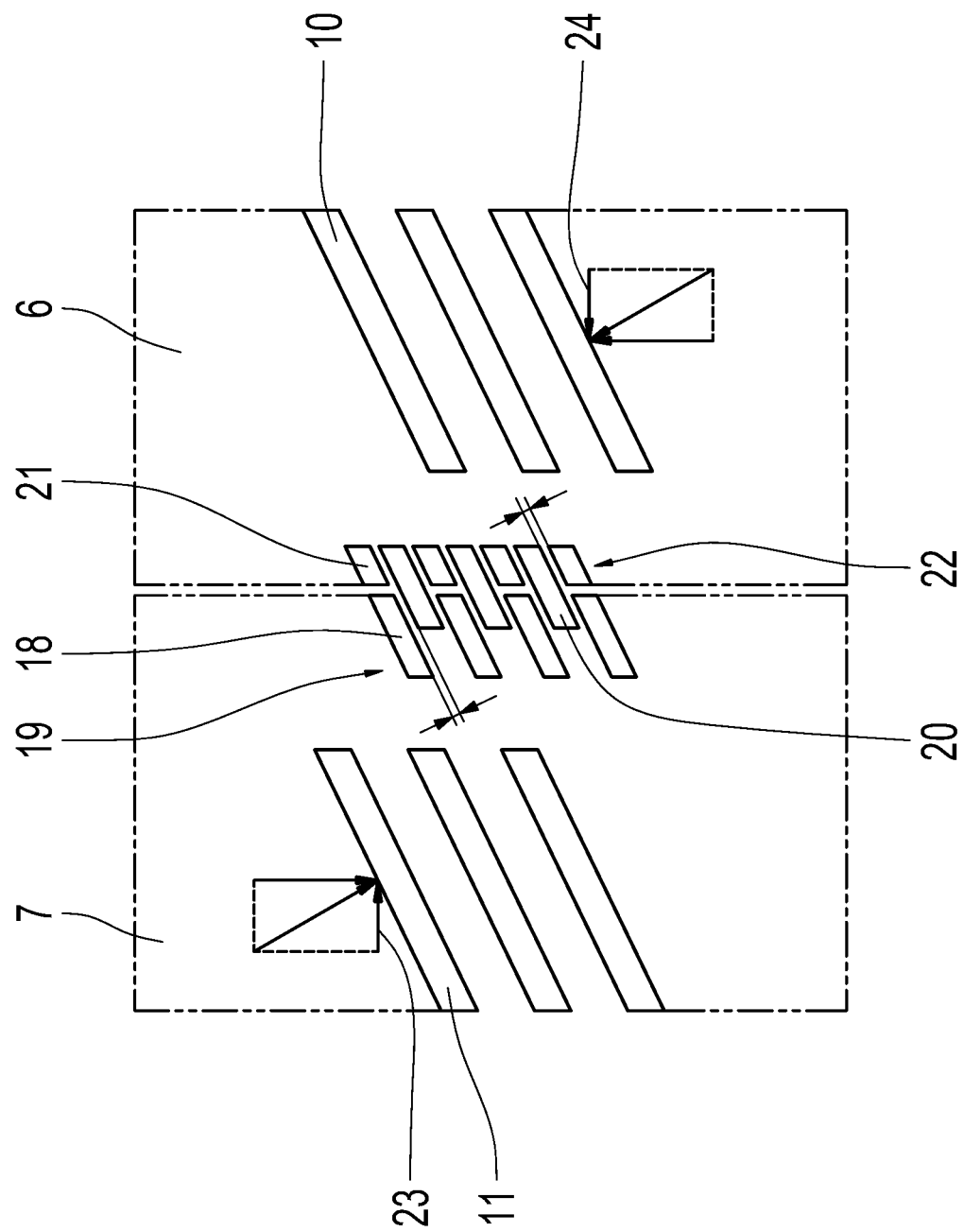
FIG. 3 shows a further schematic of the connecting arrangement from FIG. 1, shown in a second engagement condition.

Specifically, with respect to the idler gear 7, the synchronizer sleeve 17 is guided on a guide 18 which, as is apparent in the further representations in FIGS. 2 and 3, has a helical course and is specifically designed as helical gearing 19. The synchronizer sleeve 17 is likewise guided in the guide 18 with the aid of a helical gearing 20 which is indicated in FIGS. 2 and 3. Therefore, a axial relative movement of the synchronizer sleeve 17 toward the idler gear 7 also results in a turning of the synchronizer sleeve 17 relative to the idler gear 7.

With respect to the idler gear 6, an engagement geometry 21 is formed thereon, which is likewise indicated in FIGS. 2 and 3. This engagement geometry 21 likewise has a helical course and is present as helical gearing 22, wherein a tooth system of the helical gearing 22 is configured, in the circumferential direction, in such a way that the synchronizer sleeve 17 is engagable into the helical gearing 22 of the idler gear 6 via the helical gearing 20 of the synchronizer sleeve 17 during the course of an axial displacement.

In a home position of the synchronizer sleeve 17 represented in FIGS. 1 and 2, the synchronizer sleeve 17 is coupled in the direction of rotation only to the idler gear 7, while the idler gear 6 is turnable freely with respect to the synchronizer sleeve 17 and the idler gear 7. Under the effect of an actuating unit, which is not represented further here, the synchronizer sleeve 17 may now be moved out of the home position into a coupling position indicated in FIG. 3, in which the synchronizer sleeve 17 engages, via the helical gearing 20 of the synchronizer sleeve 17, into the helical gearing 22 of the engagement geometry 21. As a result, the synchronizer sleeve 17 is coupled to the idler gear 6 in the direction of rotation, which also results in a coupling of the idler gears 6 and 7 in the direction of rotation due to the fact that the coupling with the idler gear 7 in the direction of rotation is still implemented. Due to the embodiment of the guide 18 as well as the synchronizer sleeve 17 and the engagement geometry 21 as helical gearing 19, 20 and 22, axial forces are transmitted between the idler gears 6 and 7 and the synchronizer sleeve 17, and so a transmission of axial forces between the idler gears 6 and 7 also takes place.

In the present case, a maximum compensation of the axial forces now takes place. The axial forces are caused at the idler gears 6 and 7 during operation due to the configuration of the running teeth 10 and 11 as helical gearing. The reason therefor is that the running teeth 10 and 11 configured as helical gearing, as well as the helical gearing 19, 20 and 22 of the guide 18, the synchronizer sleeve 17, and the engagement geometry 21, respectively, essentially have the same pitches and the same pitch direction. As a result, the axial forces, which are indicated in FIG. 3 as arrows 23 and 24, compensate for each other, and so the idler gears 6 and 7 are essentially free from axial forces. As a result, an axial bearing of the idler gears 6 and 7 may be configured to be simple with respect to the shaft 14 rotating with respect thereto, such as a sliding bearing, which is not shown further in this case.

Figure 4:
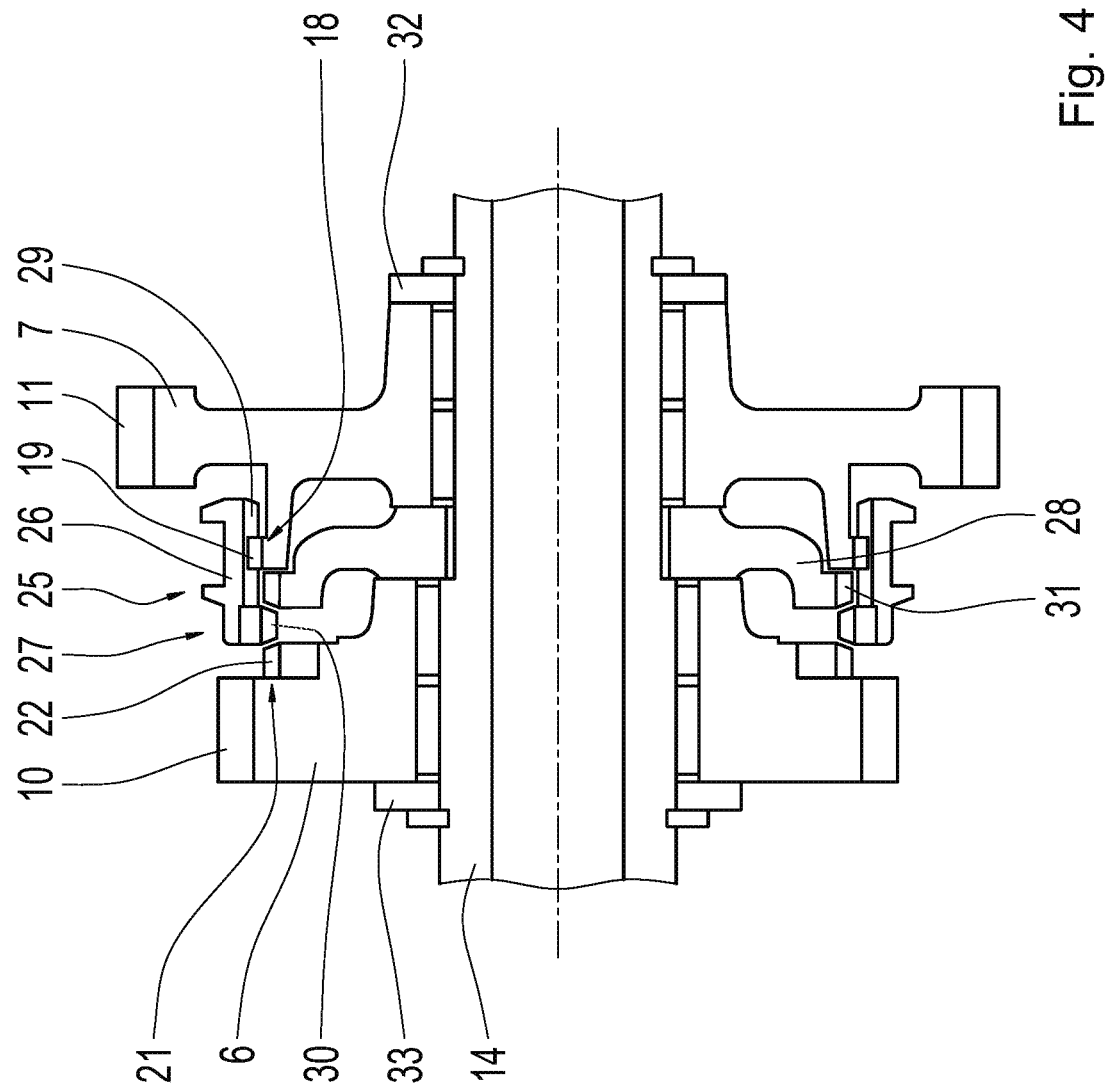
FIG. 4 shows a sectioning of a connecting arrangement according to a second design option of the invention.

FIG. 4 shows a cutaway view of a connecting arrangement 25 which is designed according to a second design option of the invention, and largely corresponds to the connecting arrangement 15 from FIGS. 1 and 3. The difference in this case, however, is that, in addition to being coupled to idler gear 6 in a rotationally fixed manner, the idler gear 7 is also couplable to the shaft 14 in a rotationally fixed manner with the aid of a coupling element 27 configured as a synchronizer sleeve 26. For this purpose, the synchronizer sleeve 26 is also movable axially out of the home position represented in FIG. 4, not only into the coupling position in which the rotationally fixed connection to the idler gear 6 is established, but also into a further coupling position in which the synchronizer sleeve 26 is coupled in the direction of rotation to a spur gear 28 which is located on the shaft 14 in a rotationally fixed manner.

As is apparent in FIG. 4, the home position of the synchronizer sleeve 26 is located axially between the coupling position with the idler gear 6 and the further coupling position with the spur gear 28 and, therefore, the shaft 14. In addition, the synchronizer sleeve 26 is equipped with two helical gearings 29 and 30, wherein the synchronizer sleeve 26 is guided via the helical gearing 29 on the helical gearing 19 of the guide 18 of the idler gear 7, while the engagement with the helical gearing 22 of the engagement geometry 21 of the idler gear 6 or with a helical gearing 31 formed on the spur gear 28 is established via the helical gearing 30 upon axial displacement into one of the two coupling positions.

A pitch of the helical gearing 31 of the spur gear 28 also essentially corresponds to the pitches of the helical gearing of the running teeth 10 and 11 and of the helical gearing 19, 22, 29 and 30. Due to this fact, axial forces of the idler gears 6 and 7 are also compensated for to the greatest possible extent in the variant from FIG. 4, and so axial bearings of the idler gears 6 and 7 may be designed to have a simpler configuration. In the present case, the axial bearings are present as merely diagrammatically indicated plain bearings 32 and 33.

With the aid of the embodiments of a connecting arrangement for the engageable coupling of two idler gears according to the invention, a transmission of axial forces between the idler gears may be implemented.

Modifications and variations can be made to the embodiments illustrated or described herein without departing from the scope and spirit of the invention as set forth in the appended claims.

REFERENCE CHARACTERS

1 transmission
2 spur gear stage
3 spur gear stage
4 fixed gear
5 fixed gear
6 idler gear
7 idler gear
8 running teeth
9 running teeth
10 running teeth
11 running teeth
12 shaft
13 shaft
14 shaft
15 connecting arrangement
16 coupling element
17 synchronizer sleeve
18 guide
19 helical gearing
20 helical gearing
21 engagement geometry
22 helical gearing
23 arrow
24 arrow
25 connecting arrangement
26 synchronizer sleeve
27 coupling element
28 spur gear
29 helical gearing 30 helical gearing
31 helical gearing
32 plain bearing
33 plain bearing

The invention claimed is:

1. A connecting arrangement (15; 25), comprising:
   a first idler gear (7);
   a second idler gear (6) arranged coaxially with the first idler gear (7);
   an engagement unit, the first and second idler gears (6, 7) connectable to each other in a rotationally fixed manner via the engagement unit, the engagement unit comprising a coupling element (16; 27) which is coupled to the first idler gear (7) in a direction of rotation and is axially movable with respect to the first idler gear (7) between a home position and a coupling position,
   wherein, in the coupling position of the coupling element (16; 27), the coupling element (16; 27) is coupled to the second idler gear (6) in addition to being coupled to the first idler gear (7) in the direction of rotation,
   wherein, in the home position of the coupling element (16; 27), the coupling element (16; 27) is freely rotatable with respect to the second idler gear (6),
   wherein the first and second idler gears (6, 7) are helical-cut spur gears, the coupling element (16; 27) is guided in a helically extending guide (18) formed on the first idler gear (7) and the coupling element (16; 27) engages into a helically extending engagement geometry (21) formed on the second idler gear (6) in the coupling position of the coupling element (16; 27), and
   wherein the first idler gear (7) is axially spaced from the second idler gear (6), and axial forces generated during operation of the helical-cut spur gears are transmittable between the first and second idler gears (6, 7) via the coupling element (16; 27) in the coupling position of the coupling element (16; 27).

2. The connecting arrangement (15; 25) of claim 1, wherein pitches of running teeth (10, 11) of the first and second idler gears (6, 7), of the helically extending guide (18), and of the helically extending engagement geometry (21) correspond to one another.

3. The connecting arrangement (15; 25) of claim 2, wherein the pitches of the running teeth (10, 11) of the first and second idler gears (6, 7), of the helically extending guide (18), and of the helically extending engagement geometry (21) have a common pitch direction.

4. The connecting arrangement (15; 25) of claim 1, wherein one or both of the helically extending guide (18) and the helically extending engagement geometry (21) is a helical gearing (19, 22).

5. The connecting arrangement (15; 25) of claim 1, wherein the coupling element (16; 27) is a synchronizer sleeve (17; 26), and the synchronizer sleeve (17; 26) is coupled in a rotationally fixed manner to both to the first and second idler gears (6, 7) in the coupling position of the coupling element (16; 27).

6. The connecting arrangement (15; 25) of claim 5, wherein:
   the synchronizer sleeve (17; 26) comprises at least one helical gearing (20; 29, 30); and
   the synchronizer sleeve (17; 26) is guided in the helically extending guide (18) via the at least one helical gearing (20; 29, 30) and/or the synchronizer sleeve (17; 26) engages into the helically extending engagement geometry (21) in the coupling position of the coupling element (16; 27).

7. The connecting arrangement (15; 25) of claim 1, wherein the engagement unit is a dog clutch.

8. The connecting arrangement of claim 1, wherein the engagement unit is a lock-synchronizer mechanism.

9. The connecting arrangement (25) of claim 1, wherein the first and second idler gears (6, 7) are rotatably mounted on a shaft (14), and the coupling element (27) is also axially movable into a further coupling position in which the coupling element (27) is rotationally fixed to the shaft (14).

10. A motor vehicle transmission (1), comprising the connecting arrangement (15; 25) of claim 1.

11. The connecting arrangement (25) of claim 1, wherein both of the first and second idler gears (6, 7) are supported by a common axial bearing in the coupling position of the coupling element (16; 27).

12. The connecting arrangement (25) of claim 1, wherein the common axial bearing is a sliding bearing.

* * * * *